United States Patent
Yin

(10) Patent No.: US 12,395,496 B2
(45) Date of Patent: Aug. 19, 2025

(54) RESOURCE OBTAINING METHOD AND SYSTEM, SERVER, AND STORAGE MEDIUM

(71) Applicant: Petal Cloud Technology Co., Ltd., Dongguan (CN)

(72) Inventor: Jiaxin Yin, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 249 days.

(21) Appl. No.: 17/920,473

(22) PCT Filed: Mar. 11, 2021

(86) PCT No.: PCT/CN2021/080239
§ 371 (c)(1),
(2) Date: Oct. 21, 2022

(87) PCT Pub. No.: WO2021/213061
PCT Pub. Date: Oct. 28, 2021

(65) Prior Publication Data
US 2023/0208850 A1    Jun. 29, 2023

(30) Foreign Application Priority Data

Apr. 23, 2020    (CN) .................. 202010327138.8

(51) Int. Cl.
*H04L 29/06*    (2006.01)
*H04L 9/40*    (2022.01)
(Continued)

(52) U.S. Cl.
CPC ........ *H04L 63/107* (2013.01); *H04L 63/0807* (2013.01); *H04W 4/025* (2013.01);
(Continued)

(58) Field of Classification Search
None
See application file for complete search history.

(56) References Cited

U.S. PATENT DOCUMENTS

2012/0169461 A1    7/2012  Dubois, Jr.
2012/0291105 A1   11/2012  Baentsch et al.
(Continued)

FOREIGN PATENT DOCUMENTS

CN    102546648 A    7/2012
CN    103404121 A   11/2013
(Continued)

*Primary Examiner* — Andrew J Steinle
(74) *Attorney, Agent, or Firm* — Conley Rose, P.C.

(57) ABSTRACT

A terminal device sends resource access request information to a server, and the resource access request information carries a user identity and an identifier of a to-be-accessed resource. The server performs authentication on the user identity. If the authentication succeeds, the server obtains location information of the terminal device, and the location information includes geographical location information and positioning assistance information. The server attempts to verify the location information of the terminal device. If the verification succeeds, the server sends an access token corresponding to the identifier of the to-be-accessed resource to the terminal device. The terminal device obtains the to-be-accessed resource based on the access token.

20 Claims, 8 Drawing Sheets

(51) Int. Cl.
*H04W 4/02* (2018.01)
*H04W 12/08* (2021.01)
*H04W 12/63* (2021.01)

(52) U.S. Cl.
CPC ........... *H04W 4/027* (2013.01); *H04W 12/08* (2013.01); *H04W 12/63* (2021.01)

(56) References Cited

U.S. PATENT DOCUMENTS

| | | | | |
|---|---|---|---|---|
| 2015/0319180 | A1* | 11/2015 | Falcou | H04L 63/0861 |
| | | | | 726/7 |
| 2018/0198775 | A1* | 7/2018 | Volini | H04L 63/08 |
| 2018/0302743 | A1* | 10/2018 | Bai | H04W 4/02 |
| 2019/0043359 | A1* | 2/2019 | Rajakondala | G08G 1/0125 |
| 2020/0336309 | A1 | 10/2020 | Wang et al. | |
| 2021/0090364 | A1 | 3/2021 | Lee et al. | |
| 2021/0105169 | A1 | 4/2021 | Choi et al. | |

FOREIGN PATENT DOCUMENTS

| | | |
|---|---|---|
| CN | 104767717 A | 7/2015 |
| CN | 106686538 A | 5/2017 |
| CN | 107222485 A | 9/2017 |
| CN | 107452095 A | 12/2017 |
| CN | 110121873 A | 8/2019 |
| EP | 2642778 A1 | 9/2013 |
| WO | 2014015147 A1 | 1/2014 |
| WO | 2018127407 A1 | 7/2018 |
| WO | 2018169304 A2 | 9/2018 |
| WO | 2019112335 A1 | 6/2019 |

\* cited by examiner

RESOURCE OBTAINING METHOD AND SYSTEM, SERVER, AND STORAGE MEDIUM

CROSS-REFERENCE TO RELATED APPLICATIONS

This is a U.S. National Stage of International Patent Application No. PCT/CN2021/080239 filed on Mar. 11, 2021, which claims priority to Chinese Patent Application No. 202010327138.8 filed on Apr. 23, 2020. Both of the aforementioned applications are hereby incorporated by reference in their entireties.

TECHNICAL FIELD

This application relates to the field of access control technologies, and in particular, to a resource obtaining method and system, a server, and a storage medium.

BACKGROUND

When a user accesses a resource by using a terminal device, if the to-be-accessed resource is a protected resource, a server or a target device generally needs to attempt to verify permission of the terminal device. The terminal device can obtain the to-be-accessed resource only after the verification succeeds. For example, when using a mobile phone to open a door lock, the user first needs to attempt to verify permission of the mobile phone. Only when the verification succeeds, the mobile phone can access the door lock, obtain status information of the door lock, and implement unlocking. In an existing permission verification method, a user identity or a distance between a terminal device and a target device is generally verified. If the verification succeeds, the terminal device can obtain a protected resource. Because the user identity or the distance between the terminal device and the target device is easy to be forged or have an error, irrelevant devices are likely to obtain the protected resource, and the protected resource cannot be properly managed and controlled. This undermines resource access security.

SUMMARY

Embodiments of this application provide a resource obtaining method and system, a server, and a storage medium, to manage and control a protected resource more properly, thereby improving resource access security.

According to a first aspect, an embodiment of this application provides a resource obtaining method, including:

A terminal device sends resource access request information for accessing a target device to a server, and the resource access request information carries a user identity and an identifier of a to-be-accessed resource. The server performs authentication on the user identity. If the authentication succeeds, the server obtains location information of the terminal device, and the location information includes geographical information and positioning assistance information. The server attempts to verify the location information of the terminal device. If the verification succeeds, the server sends an access token corresponding to the identifier of the to-be-accessed resource to the terminal device. The terminal device obtains the to-be-accessed resource corresponding to the identifier of the to-be-accessed resource from the target device based on the access token.

In the foregoing embodiment, the terminal device sends the resource access request information for accessing the target device to the server. The server first performs authentication on the user identity in the resource access request information. If the authentication succeeds, the server obtains the location information of the terminal device, and attempts to verify the location information of the terminal device. The location information includes the geographical location information and the positioning assistance information, and only when the verification on the location information succeeds, the server is allowed to send the access token to the terminal device, to indicate the terminal device to obtain, from the target device, the to-be accessed resource corresponding to the identifier of the to-be-accessed resource based on the access token, thereby improving accuracy of the verification on the location information, reducing a probability that an irrelevant device obtains the to-be-accessed resource. This implements proper control and management on the to-be-accessed resource, and improves resource access security.

According to a second aspect, an embodiment of this application provides a resource obtaining method, including:

A server obtains resource access request information that is for accessing a target device and that is sent by a terminal device, and the resource access request information carries a user identity and an identifier of a to-be-accessed resource. The server authenticates the user identity. The server obtains location information of the terminal device, and the location information includes geographical location information and positioning assistance information. The server successfully verifies the location information of the terminal device. The server sends an access token corresponding to the identifier of the to-be-accessed resource to the terminal device, to indicate the terminal device to obtain the to-be-accessed resource corresponding to the identifier of the to-be-accessed resource based on the access token from the target device.

In the foregoing embodiment, when receiving the resource access request information that is for accessing the target device and that is sent by the terminal device, the server not only performs authentication on the user identity, but also attempts to verify the location information of the terminal device. The terminal device is allowed to access the to-be-accessed resource only when the verification on the location information of the terminal device succeeds, thereby reducing a probability that an irrelevant device obtains the to-be-accessed resource. In addition, because the location information includes the geographical location information and the positioning assistance information, in addition to attempting to verify the geographical location information of the terminal device, the server further attempts to verify the positioning assistance information, thereby improving accuracy of the verification on the location information, and further reducing a probability that an irrelevant device obtains the to-be-accessed resource. In this way, the to-be-accessed resource is managed and controlled more properly, and resource access security is improved. In addition, because the authentication on the user identity, the verification on the location information of the terminal device, and sending of the access token are performed by the server, it is convenient for the server to synchronously update permission of the terminal device and the target device, thereby preventing a case in which use is affected because either party fails to update the permission in time. This further improves resource access security.

In a possible implementation of the second aspect, the positioning assistance information includes positioning precision, a positioning delay, a positioning manner, a movement speed, and/or a movement direction. The server obtains the geographical location information of the terminal device and a corresponding location parameter in the positioning assistance information based on an actual application scenario, and attempts to verify the geographical location information and the positioning assistance information. For example, in a scenario, the server attempts to verify the geographical location information, the positioning precision, and the positioning delay of the terminal device. In another scenario, the server attempts to verify the geographical location information and the movement speed of the terminal device, so that a location parameter in the location information is fully used, thereby improving accuracy of the verification on the location information.

Correspondingly, that the server successfully verifies the location information of the terminal device includes:

The server determines, based on the geographical location information, that the terminal device is within a predetermined area, and determines that the positioning assistance information meets a preset condition. To be specific, if both the geographical location information and the positioning assistance information are successfully verified, the location information is successfully verified. This prevents forging or obtaining incorrect geographical location information, reduces a probability that an irrelevant device obtains the to-be-accessed resource, and implements proper management and control of the to-be-accessed resource.

In a possible implementation of the second aspect, the to-be-accessed resource is traffic light phase information, and the positioning assistance information includes the movement direction. Correspondingly, that the server determines, based on the geographical location information, that the terminal device is within a predetermined area, and determines that the positioning assistance information meets a preset condition includes: The server determines, based on the geographical location information, that the terminal device is within the predetermined area, and determines that the movement direction of the terminal device is consistent with a preset direction. Different movement directions correspond to different traffic light phase information. The corresponding traffic light phase information can be obtained only when the terminal device is in the predetermined area and the movement direction of the terminal device is consistent with the preset direction. This prevents incorrect authorization from being performed on irrelevant devices, to perform more proper management and control on the to-be-accessed resource.

Optionally, the positioning assistance information further includes the positioning delay, and the determining that the positioning assistance information meets a preset condition further includes: determining that the positioning delay is less than preset duration. If the positioning delay exceeds the preset duration, when the server receives the location information of the terminal device, the terminal device has left a current location. As a result, the geographical location information received by the server cannot reflect an actual current location of the terminal device. The positioning delay is verified, and the verification succeeds only when the positioning delay is less than the preset duration. This improves accuracy of the geographical location information obtained by the server.

In a possible implementation of the second aspect, the to-be-accessed resource is a navigation map, and the positioning assistance information includes the movement speed. Correspondingly, that the server determines, based on the geographical location information, that the terminal device is within a predetermined area, and determines that the positioning assistance information meets a preset condition includes: The server determines, based on the geographical location information, that the terminal device is within the predetermined area, and determines that the movement speed of the terminal device is less than a preset speed. If the moving speed of the terminal device is excessively high, when the server detects the location information of the terminal device, the terminal device has left a location at which the location information is sent. As a result, the obtained location information of the terminal device is not accurate. By attempting to verify the movement speed of the terminal device, accuracy of the location information obtained by the server is improved.

In a possible implementation of the second aspect, that the verification performed by the server on the location information of the terminal device succeeds includes: The server determines, based on the geographical location information and the positioning assistance information, that the terminal device is within the predetermined area. For example, the server determines, based on the geographical location information, the movement speed, and the positioning delay of the terminal device, that the terminal device is within the predetermined area. Alternatively, the server determines, based on the geographical location information and the positioning precision of the terminal device, that the terminal device is within the predetermined area. This improves accuracy of the verification on the location information, and reduces a probability that verification on location information of an irrelevant device succeeds.

In a possible implementation of the second aspect, the to-be-accessed resource is status information of a door lock, and the positioning assistance information includes the positioning precision. Correspondingly, that the server determines, based on the geographical location information and the positioning assistance information, that the terminal device is within a predetermined area includes: The server calculates, based on the geographical location information and the positioning precision, a location range in which the terminal device is located, and determines that the location range in which the terminal device is located is within the predetermined area. Because an error exists in the geographical location information obtained by the server, when the geographical location information is within the predetermined area, an actual location of the terminal device may not be within the predetermined area. When the location range in which the terminal device is located is calculated based on the geographical location information and the positioning precision, and it is determined that the location range in which the terminal device is located is within the predetermined area, there is a higher probability that the terminal device is located in the predetermined area, thereby improving accuracy of the verification on the location information, and further improving security of the door lock.

In a possible implementation of the second aspect, that a server obtains location information of the terminal device includes: The server obtains the location information of the terminal device collected by a positioning apparatus. The positioning apparatus includes at least one of the following: a built-in positioning apparatus in the terminal device, a built-in positioning apparatus in the target device, a positioning apparatus within a predetermined range away from the target device, or a built-in positioning apparatus in a third-party server.

According to a third aspect, an embodiment of this application provides a resource obtaining apparatus, including:

A first obtaining module, configured to obtain resource access request information that is for accessing a target device and that is sent by a terminal device, where the resource access request information carries a user identity and an identifier of a to-be-accessed resource;

An authentication module, configured to authenticate the user identity;

A second obtaining module, configured to obtain location information of the terminal device, where the location information includes geographical location information and positioning assistance information;

A verification module, configured to successfully verify the location information of the terminal device; and A sending module, configured to send an access token corresponding to the identifier of the to-be-accessed resource to the terminal device, to indicate the terminal device to obtain, from the target device based on the access token, the to-be-accessed resource corresponding to the identifier of the to-be-accessed resource.

In a possible implementation of the third aspect, the positioning assistance information includes positioning precision, a positioning delay, a positioning manner, a movement speed, and/or a movement direction.

In a possible implementation of the third aspect, the verification module is specifically configured to:

determine, based on the geographical location information, that the terminal device is within a predetermined area, and determine that the positioning assistance information meets a preset condition.

In a possible implementation of the third aspect, the to-be-accessed resource is traffic light phase information, and the positioning assistance information includes the movement direction.

Correspondingly, the verification module is specifically configured to:

determine, based on the geographical location information, that the terminal device is within the predetermined area, and determine that the movement direction of the terminal device is consistent with a preset direction.

In a possible implementation of the third aspect, the positioning assistance information further includes the positioning delay, and the verification module is further configured to determine that the positioning delay is less than preset duration.

In a possible implementation of the third aspect, the to-be-accessed resource is a navigation map, and the positioning assistance information includes the movement speed.

Correspondingly, the verification module is specifically configured to:

determining, based on the geographical location information, that the terminal device is within the predetermined area, and determine that the movement speed of the terminal device is less than a preset speed.

In a possible implementation of the third aspect, the verification module is specifically configured to determine, based on the geographical location information and the positioning assistance information, that the terminal device is within the predetermined area.

In a possible implementation of the third aspect, the to-be-accessed resource is status information of a door lock, and the positioning assistance information includes the positioning precision.

Correspondingly, the verification module is specifically configured to: calculate, based on the geographical location information and the positioning precision, a location range in which the terminal device is located, and determine that the location range in which the terminal device is located is within the predetermined area.

In a possible implementation of the third aspect, the second obtaining module is specifically configured to:

obtain location information of the terminal device collected by a positioning apparatus, where the positioning apparatus includes at least one of the following:

a built-in positioning apparatus in the terminal device, a built-in positioning apparatus in the target device, a positioning apparatus within a predetermined range from the target device, and a built-in positioning apparatus in a third-party server.

According to a fourth aspect, an embodiment of this application provides a server, including a memory, a processor, and a computer program that is stored in the memory and that can be run on the processor. When the processor executes the computer program, the resource obtaining method according to the second aspect is implemented.

According to a fifth aspect, an embodiment of this application provides a computer-readable storage medium. The computer-readable storage medium stores a computer program, and when the computer program is executed by a processor, the resource obtaining method according to the second aspect is implemented.

According to a sixth aspect, an embodiment of this application provides a computer program product. When the computer program product runs on an electronic device, the electronic device is enabled to perform the resource obtaining method according to the second aspect.

According to a seventh aspect, an embodiment of this application provides a resource obtaining system, including a terminal device, a target device, and the server according to the fourth aspect.

In a possible implementation of the seventh aspect, the resource obtaining system further includes a positioning apparatus.

It may be understood that for beneficial effects of the third aspect to the seventh aspect, refer to related descriptions of the second aspect. Details are not described herein again.

DESCRIPTION OF EMBODIMENTS

In the following description, for illustration instead of limitation, specific details such as a particular system structure and a technology are provided to facilitate a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Figure 1:
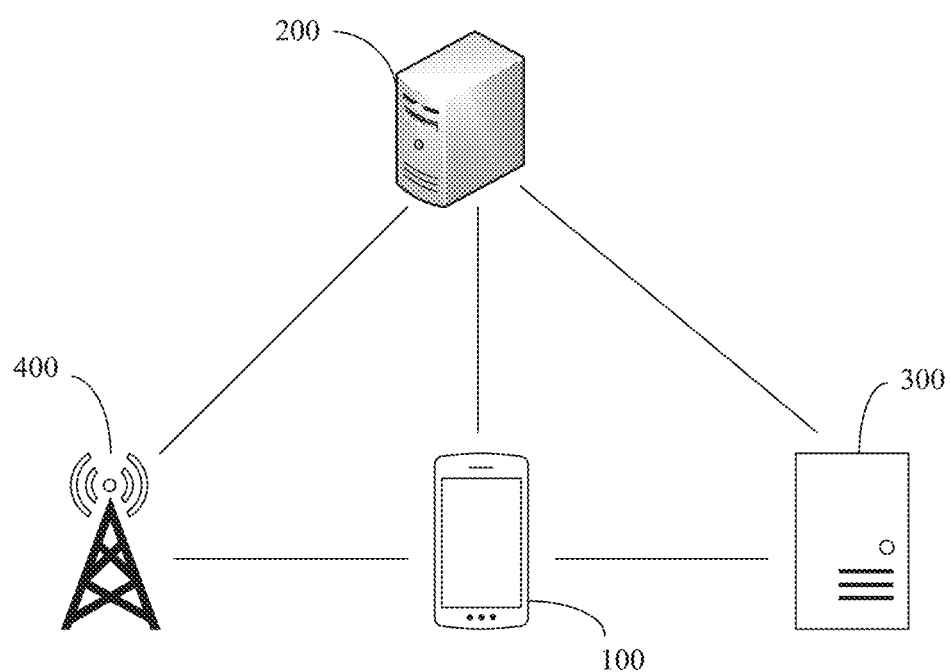
FIG. 1 is a schematic diagram of a resource obtaining system according to an embodiment of this application.

FIG. 1 is a schematic diagram of a resource obtaining system according to an embodiment of this application. As shown in FIG. 1, the resource obtaining system includes a terminal device 100, a server 200, and a target device 300. The target device 300 stores a to-be-accessed resource, and the to-be-accessed resource may be status information of a door lock, traffic light phase information, a navigation map, a data gift grabbing link, or the like. The terminal device 100 sends resource access request information for accessing the target device to the server 200. The resource access request information includes a user identity and an identifier of the to-be-accessed resource. The server 200 performs authentication on the user identity, and if the authentication succeeds, obtains location information of the terminal device 100. The location information includes geographical location information and positioning assistance information. The server 200 attempts to verify the location information of the terminal device 100 based on pre-obtained verification information, and if the verification succeeds, sends an access token corresponding to the identifier of the to-be-accessed resource to the terminal device 100. The terminal device 100 sends the obtained access token to the target device 300, and the target device 300 attempts to verify the access token. If the verification succeeds, the terminal device obtains the to-be-accessed resource corresponding to the identifier of the to-be-accessed resource. For example, if the to-be-accessed resource is the status information of the door lock, the terminal device obtains the status information of the door lock corresponding to the identifier of the to-be-accessed resource, and controls the status information of the door lock to change to an unlocked state, to open the door lock. If the to-be-accessed resource is the navigation map, the terminal device may download the navigation map corresponding to the identifier of the to-be-accessed resource. Before the terminal device obtains the to-be-accessed resource, the server not only performs authentication on the user identity, but also attempts to verify the location information of the terminal device. The terminal device can obtain the to-be-accessed resource based on the access token only when the verification on the location information succeeds, thereby reducing a probability that an irrelevant device obtains the to-be-accessed resource. In this way, resource access security is improved. In addition, because the location information includes the geographical location information and the positioning assistance information, the probability that an irrelevant device obtains the to-be-accessed resource is further reduced, so that the to-be-accessed resource can be managed and controlled more properly.

In this embodiment, the terminal device may be a mobile phone, a tablet computer, a notebook computer, an in-vehicle terminal, or the like. A specific type of the terminal device is not limited in this embodiment of this application.

In a possible implementation, the resource obtaining system further includes a positioning apparatus 400 configured to collect the location information of the terminal device. The positioning apparatus may be built in the terminal device 100, or may be independent of the terminal device 100. For example, the positioning apparatus is a built-in positioning apparatus in the target device 300, a positioning apparatus within a predetermined range from the target device, or a built-in positioning apparatus in a third-party server. If the positioning apparatus is built in the terminal device 100, location information of the positioning apparatus is the location information of the terminal device 100. If the positioning apparatus 400 and the terminal device 100 are two independent devices, the server 200 positions the terminal device 100 based on the location information of the terminal device 100 and/or the location information of the positioning apparatus 400. For example, in an application scenario, the positioning apparatus 400 is a base station, and the server 300 calculates the location information of the terminal device 100 based on location information of the base station and a coverage area of a base station to which the terminal device 100 is registered. In another application scenario, a GPS positioning module is disposed on the terminal device 100, and a wireless fidelity network (for example, WI-FI) positioning module is disposed on the positioning apparatus 400. When a satellite signal is relatively good, the GPS positioning module of the terminal device 100 is selected for positioning, and the location information of the terminal device 100 is calculated based on positioning information of the GPS positioning module. When there is no satellite signal, the WI-FI positioning module of the positioning apparatus 400 is selected for positioning, and the location information of the terminal device 100 is calculated based on the location information of the positioning apparatus 400. Because corresponding positioning manners are selected with reference to different network environments, more accurate location information can be obtained in different scenarios.

Figure 2:
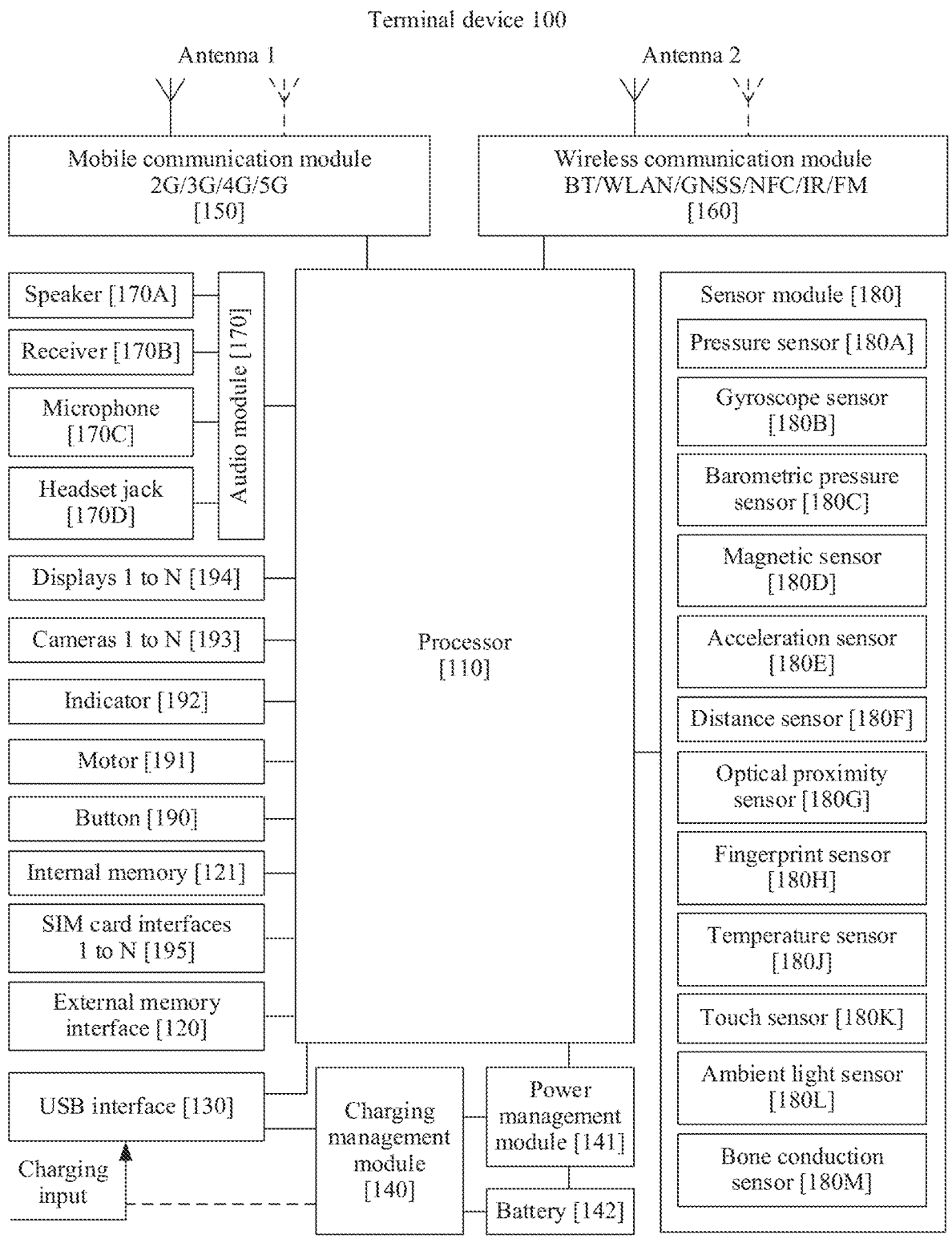
FIG. 2 is a schematic diagram of a structure of a terminal device according to an embodiment of this application.

For ease of understanding, a terminal device in embodiments of this application is first described. FIG. 2 is a schematic diagram of a structure of a terminal device 100 according to an embodiment of this application.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 1803, a touch sensor 180K, an ambient light sensor 180L, a bone conduction sensor 180M, and the like.

It can be understood that, a structure illustrated in this embodiment of this application does not constitute a specific limitation on the terminal device 100. In some other embodiments of this application, the terminal device 100 may include more or fewer parts than those shown in the figure, or combine some parts, or split some parts, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory can store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal device 100 may be configured to cover one or more communications frequency bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communications solution applied to the terminal device 10, including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The wireless communications module 160 may provide a wireless communication solution that is applied to the terminal device 100, and that includes wireless local area networks (WLAN) (for example, WI-FI), BLUETOOTH (a wireless communication technology), a global navigation satellite system (GNSS), frequency modulation (FM), a near field communication (NFC) technology, an infrared (IR) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communications module 150, and the antenna 2 thereof is coupled to the wireless communications module 160, so that the terminal device 100 can communicate with a network and another device by using a wireless communication technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BLUETOOTH, a GNSS, a WLAN, NFC, FM, and/or an IR technology. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diode, QLED), or the like. In some embodiments, the terminal device 100 may include one or N displays 194, where N is a positive integer greater than 1.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The internal memory 121 may be configured to store computer-executable program code, and the executable program code includes instructions. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the terminal device 100. In addition, the internal memory 121 may include a high-speed random access memory, or may include a nonvolatile memory, for example, at least one magnetic disk storage device, a flash memory, a universal flash storage (universal flash storage, UFS), or the like. The processor 110 performs various function applications and data processing of the terminal device 100 by running the instructions stored in the internal memory 121 and/or the instructions stored in the memory disposed in the processor.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The touch sensor 180K is also referred to as a "touch component". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal device 100 at a location different from a location of the display 194.

The button 190 includes a power button, a volume button, and the like. The button 190 may be a mechanical button, or may be a touch button. The terminal device 100 may receive button input, and generate button signal input related to a user setting and function control of the terminal device 100.

The SIM card interface 195 is configured to connect to a SIM card. The terminal device 100 interacts with a network through the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

With reference to a specific application scenario, the following describes a resource obtaining method provided in an embodiment of this application.

Figure 3:
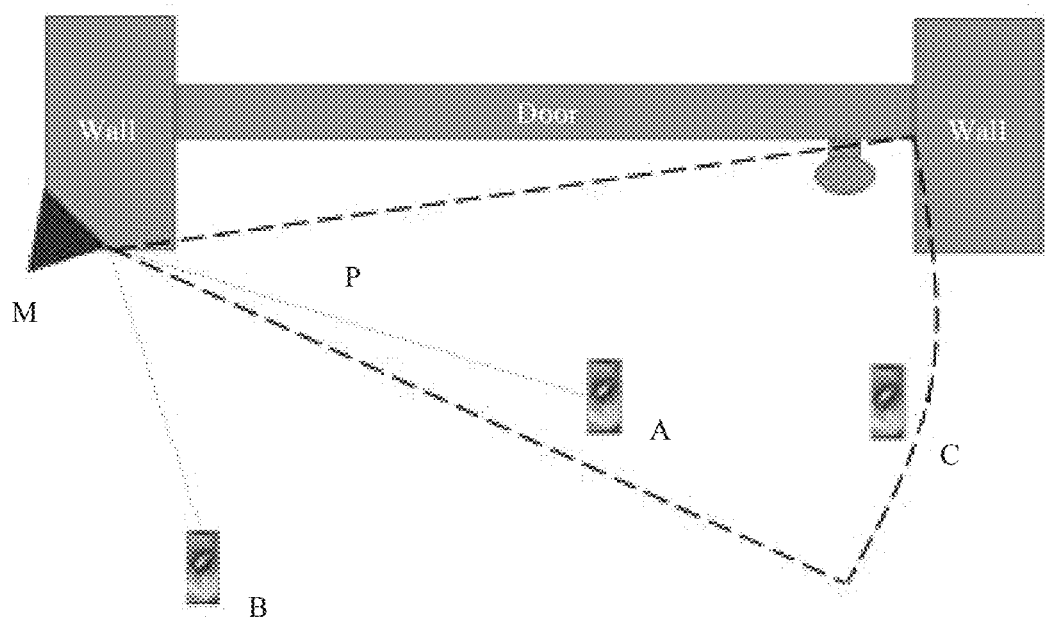
FIG. 3 is a diagram of an application scenario of a resource obtaining method according to an embodiment of this application.

In an application scenario, the resource obtaining method provided in this embodiment of this application is used to open a door lock. As shown in FIG. 3, in this scenario, a target device is the door lock, and a to-be-accessed resource is status information of the door lock.

Figure 4:
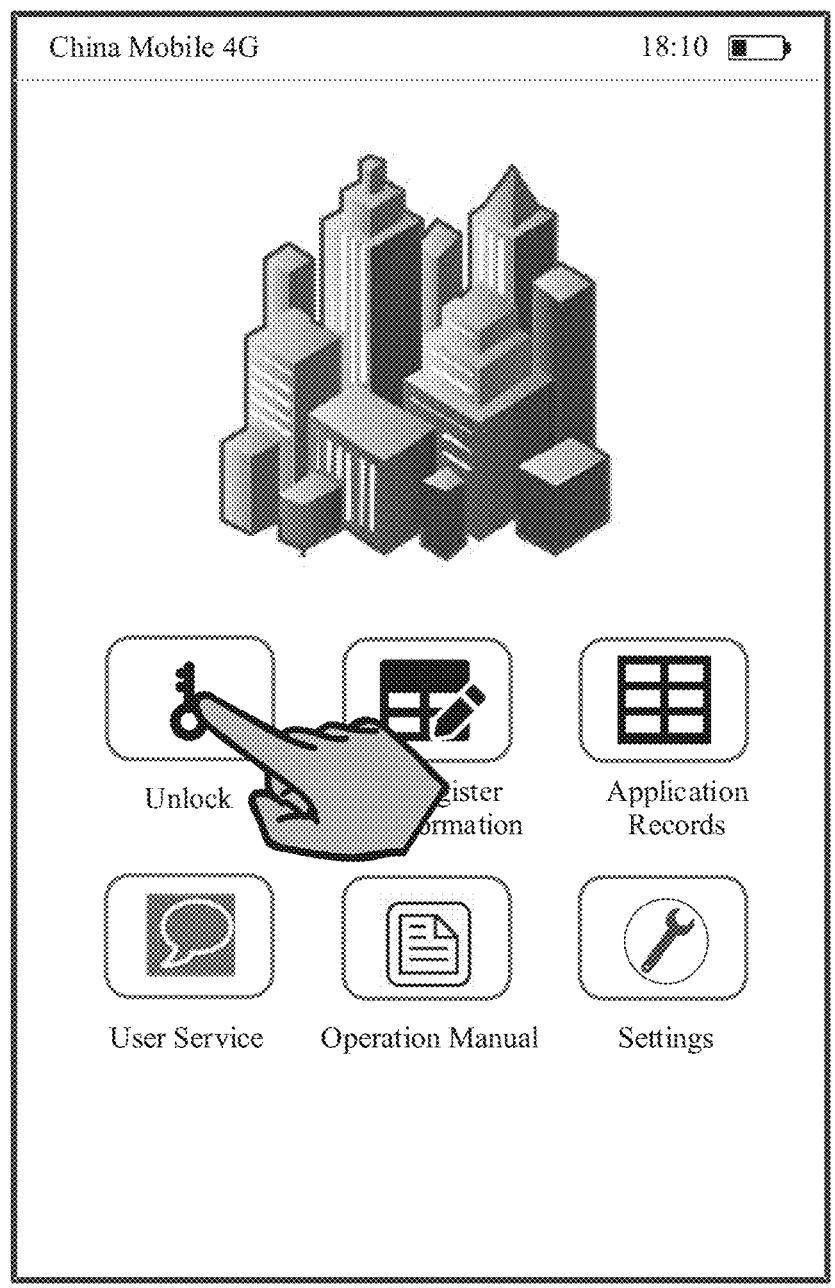
FIG. 4 is a diagram of an application scenario of a resource obtaining method according to an embodiment of this application.

A terminal device sends resource access request information to a server based on an operation of a user. Alternatively, sending of resource access request information is automatically triggered when a terminal device enters a preset area. For example, as shown in FIG. 4, when the terminal device is on an unlocking interface, if detecting a touch operation performed by the user on an "unlocking" icon, the terminal device sends the resource access request information to the server. The resource access request information includes a user identity during user registration and an identifier of the status information of the door lock. The user identity may be account information of the user, or may be an identifier of a terminal device bound to the user identity. The identifier of the status information of the door lock may be a storage path of the status information of the door lock. The identifier of the status information of the door lock corresponds to an identifier of the door lock.

After receiving the resource access request information, the server performs authentication on the user identity, for example, attempts to verify whether the user corresponding to the user identity has access permission for the door lock. If the user corresponding to the user identity has the access permission for the door lock, the authentication succeeds. If the authentication succeeds, the server obtains location information of the terminal device. The server may obtain the location information of the terminal device by using a positioning apparatus, and the positioning apparatus may be a UWB positioning apparatus located near the door lock. Specifically, the server obtains an identifier of the terminal device and an identifier of the positioning apparatus based on the user identity, and sends a positioning instruction to the positioning apparatus corresponding to the identifier of the positioning apparatus, where the positioning instruction includes the identifier of the terminal device. The positioning apparatus obtains a relative location between the terminal device and the positioning apparatus based on the identifier of the terminal device, that is, the location information of the terminal device, and sends the location information of the terminal device to the server. The location information includes geographical location information and positioning assistance information, and the positioning assistance information includes positioning precision.

After obtaining the location information of the terminal device, the server attempts to verify the location information of the terminal device. Specifically, the server obtains verification information corresponding to the identifier of the door lock. The verification information includes a location parameter that needs to be verified and a range corresponding to the location parameter that needs to be verified. The server attempts to verify the obtained location information based on the range corresponding to the location parameter that needs to be verified. In this embodiment, the location parameter that needs to be verified in the verification information includes geographical location information and positioning precision. The geographical location information is in a format of distance information and angle information, the distance information is a distance between the terminal device and the positioning apparatus, and the angle information is an angle between the terminal device and a preset reference line. The geographical location information is set to the format of the distance information and the angle information. During location verification, the distance information and the angle information are separately verified. For example, if a range corresponding to the angle information is located in a specified area outside a door, the verification succeeds and the door lock is opened only when the terminal device is located outside the door. This improves accuracy of the verification on the location information, and further improves security of the door lock.

For example, as shown in FIG. 3, the specified unlocking area is a sector area P that uses the positioning apparatus M as a circle center, has a radius of 2 meters, uses a straight line that passes through the positioning apparatus and is parallel to the door as a reference line, and has an angle of −30° to 30°. The door lock can be opened only when the terminal device is located in the unlocking area. In other words, the user can unlock the door only in the specified area outside the door. In the location parameter that needs to be verified, a range corresponding to the geographical location information is: an angle −30° to 30°, and a distance less than 2 meters. The server calculates, based on the obtained geographical location information and the positioning precision of the terminal device, a location range in which the terminal device is located, and determines that the location range in which the terminal device is located is within a predetermined area.

For example, if the terminal device is located at a location A, an angle between the location A and the reference line is −10°, a distance between the location A and the positioning apparatus is 1.5 meters, and positioning precision is 0.05 meters. The distance from the positioning apparatus that is calculated based on the distance from the positioning apparatus and the positioning precision is between 1.45 meters and 1.55 meters and is less than 2 meters, and the angle is between −30° and 30°, which is consistent with the range corresponding to the geographical location information. Therefore, the verification succeeds. If the terminal device is located at a location B, an angle between the location B and the reference line is −60°, a distance between the location B and the positioning apparatus is 1 meter, and positioning precision is 0.05 meters. Because the angle at which the location B is located is not between −30° and 30°, the verification fails. If the terminal device is located at a location C, an angle between the location C and the reference line is 0°, a distance between the location C and the positioning apparatus is 1.9 meters, and positioning precision is 0.2 meters. A distance between the terminal device and the positioning apparatus that is calculated based on the distance between the terminal device and the positioning apparatus and the positioning precision is between 1.7 meters and 2.1 meters, and the distance may be greater than 2 m. Therefore, the verification fails.

It should be noted that the server may also separately attempt to verify the geographical location information and the positioning precision of the terminal device. When it is determined, based on the geographical location information, that the terminal device is within the predetermined area, and the positioning precision matches preset positioning precision, the verification succeeds. For example, the preset positioning precision is 10 centimeters. If the geographical location information of the terminal device is within the predetermined area, and the positioning precision is 5 centimeters, the verification on the location information succeeds.

In another possible implementation, if the to-be-accessed resource is the status information of the door lock, and the positioning assistance information includes a positioning manner, that is, the location parameter that needs to be verified in the verification information includes the geographical location information and the positioning manner, the server determines, based on the geographical location information of the terminal device, whether the terminal device is within the predetermined area, and determines whether the positioning manner matches a preset positioning manner. The preset positioning manner may be set to a UWB positioning manner. For example, if the server obtains the location information sent by the terminal device and the location information sent by the UWB positioning apparatus, and a positioning manner corresponding to the location information sent by the terminal device is GPS positioning, the verification fails. If the positioning manner corresponding to the location information sent by the UWB positioning apparatus is the UWB positioning manner, geographical location information corresponding to the UWB positioning manner is used as the geographical location information of the terminal device, and the geographical location information corresponding to the UWB positioning manner is further verified. If the verification on the geographical location information succeeds, the verification on the location information succeeds. Different positioning manners correspond to different positioning precision. For example, positioning precision corresponding to the UWB positioning manner may reach a centimeter level. If the verification on the positioning manner in the location information succeeds, it indicates that the positioning precision meets a preset requirement. This improves accuracy of the obtained location information, reduces a probability that an irrelevant device obtains the status information of the door lock, and improves a security level of door lock access.

In another possible implementation, if the to-be-accessed resource is the status information of the door lock, and the positioning assistance information includes the positioning manner and the positioning precision, when determining that a current positioning manner is consistent with the preset positioning manner, the server further needs to determine, based on the geographical location information and the positioning precision, whether the terminal device is within the predetermined area. If the terminal device is within the predetermined area, the verification on the location information succeeds.

If the verification on the location information succeeds, the server sends an access token corresponding to the identifier of the status information of the door lock to the terminal device. After obtaining the access token, the terminal device sends the access token to the door lock. The door lock attempts to verify the access token. If the verification succeeds, the terminal device obtains the status information of the door lock, and changes the status information of the door lock to an unlocked state, to open the door lock.

In the foregoing embodiment, after the authentication on the user identity succeeds, the server further attempts to verify the geographical location information, the positioning precision, and the positioning manner of the terminal device. The terminal device can open the door lock only when the verification on the geographical location information, the positioning precision, and the positioning manner all succeed. This improves accuracy of verification on the location information, reduces a probability that an irrelevant device obtains the status information of the door lock, and improves security of the door lock.

Figure 5:
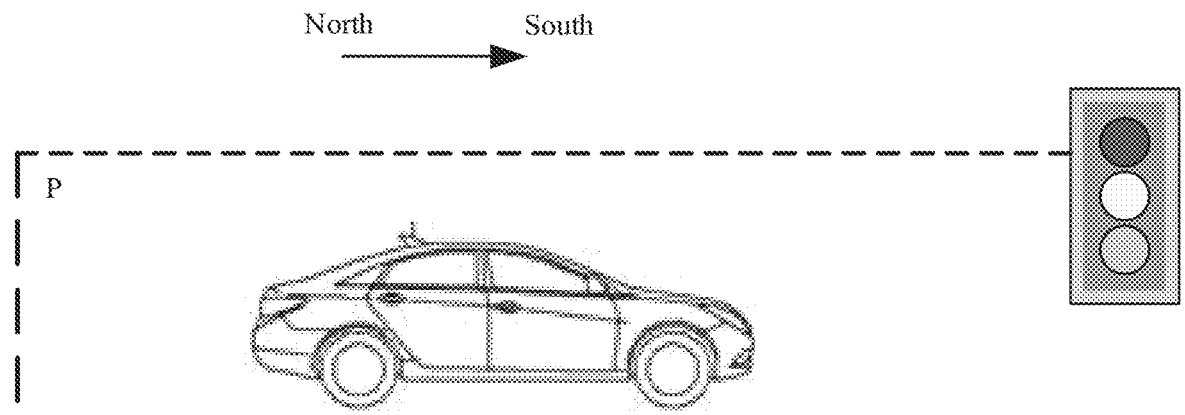
FIG. 5 is a diagram of another application scenario of a resource obtaining method according to an embodiment of this application.

In another application scenario, the resource obtaining method provided in this embodiment of this application is used to obtain traffic light phase information. As shown in FIG. 5, the target device is a traffic light, and the to-be-accessed resource is the traffic light phase information.

Figure 6:
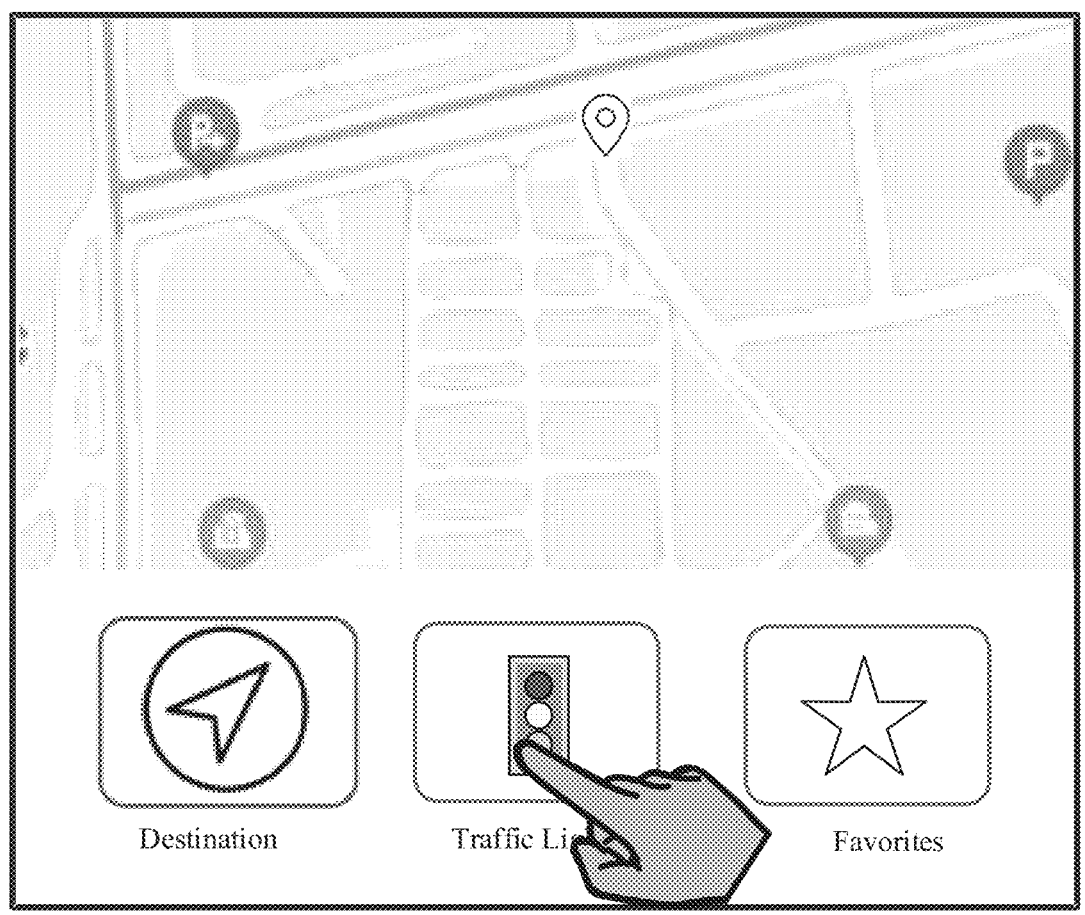
FIG. 6 is a diagram of another application scenario of a resource obtaining method according to an embodiment of this application.

When entering a specified range of the traffic light, the terminal device sends the resource access request information to the server based on an operation of the user, or sending of the resource access request information is automatically triggered. For example, when a vehicle enters the specified range of the traffic light, if it is detected that the user selects a traffic light at a current location on a navigation interface of the vehicle, the vehicle sends the resource access request information to the server. For another example, when the user scans a corresponding two-dimensional code on the traffic light at the current location by using a mobile phone, the mobile phone sends the resource access request information to the server. As shown in FIG. 6, an example in which the terminal device is a vehicle is used. On a current navigation interface, if a touch operation performed by the user on a "traffic light" icon is detected, the terminal device sends the resource access request information to the server. The resource access request information includes the user identity and an identifier of the traffic light phase information. The identifier of the traffic light phase information corresponds to an identifier of the traffic light at the current location.

After receiving the resource access request information, the server performs authentication on the user identity. For example, it is verified whether a vehicle corresponding to a vehicle identifier has permission to access the traffic light phase information. If the vehicle corresponding to the vehicle identifier has the permission to access the traffic light phase information, the authentication succeeds. If the authentication succeeds, the server obtains the location information of the terminal device. For example, if the terminal device is a vehicle, the server obtains a vehicle identifier corresponding to the user identity, and sends a location information obtaining request to a vehicle corresponding to the vehicle identifier. The vehicle sends the location information to the server. The location information includes the geographical location information and the positioning assistance information, and the positioning assistance information includes a movement direction. The movement direction may be sent by the vehicle to the server, or may be determined by the server based on geographical location information that is sent by the vehicle and that is at at least two moments.

After obtaining the location information of the terminal device, the server attempts to verify the location information of the terminal device. Specifically, the server obtains verification information corresponding to the identifier of the traffic light. The verification information includes a location parameter that needs to be verified and a range corresponding to the location parameter that needs to be verified. The server attempts to verify the obtained location information based on the range corresponding to the location parameter that needs to be verified. In this embodiment, the location parameter that needs to be verified in the verification information includes the geographical location information and the movement direction, a range corresponding to the geographical location information is a predetermined area, and a range corresponding to the movement direction is a preset direction. If the server determines, based on the geographical location information, that the terminal device is within the predetermined area, and the movement direction of the terminal device is consistent with the preset direction, the verification succeeds. For example, in the verification information, the range corresponding to the geographical location information is an area P in FIG. 5, and the movement direction is north-south. When it is determined, based on the geographical location information, that the terminal device is located in the area P, and the movement direction is north-south, the verification succeeds. Because traffic light phases corresponding to vehicles driving in different directions are inconsistent, for example, traffic light phase information corresponding to a vehicle driving from east to west and a vehicle driving from south to north are different, the geographical location information and the movement direction of the terminal device are verified, to avoid sending incorrect traffic light phase information to the terminal device.

In another feasible implementation, if the to-be-accessed resource is the traffic light phase information, the positioning assistance information further includes a positioning delay. When the server determines, based on the geographical location information, that the terminal device is within the predetermined area, and the movement direction of the terminal device is consistent with the preset direction, whether the positioning delay in the location information is less than preset duration further needs to be verified. If the positioning delay is less than the preset duration, the verification succeeds. For example, a positioning delay in the verification information is less than 1 second. If the positioning delay in the location information of the terminal device obtained by the server is less than 1 second, the verification succeeds. Because a movement speed of the vehicle is relatively high, if the positioning delay is excessively long, when the server obtains the location information of the terminal device, the terminal device has left the current location. If the server indicates, based on the current location, the traffic light to send the corresponding traffic light phase information to the terminal device, an actual requirement of the vehicle cannot be met. By attempting to verify the positioning delay, real-time performance of the obtained geographical location information is improved, and a probability of sending incorrect traffic light phase information to the terminal device is reduced.

In another possible implementation, the positioning assistance information further includes the positioning manner and the positioning precision. The location information can be verified only when the geographical location information, the movement direction, the positioning delay, the positioning manner, and the positioning precision of the terminal device are all consistent with the range corresponding to the location parameter that needs to be verified. In this way, accuracy of the verification on the location information is further improved, and a probability of sending the traffic light phase information to an irrelevant device is reduced.

In a possible implementation, a GPS positioning apparatus is disposed on the vehicle. The server obtains the vehicle identifier corresponding to the user identity, and separately sends a request for obtaining the location information of the vehicle to the GPS positioning apparatus corresponding to the vehicle identifier and an operator base station. The GPS positioning apparatus and the operator base station separately send the obtained location information to the server, and the server attempts to verify the location information corresponding to the two positioning manners. If the location information corresponding to either positioning manner is consistent with the range corresponding to the location parameter that needs to be verified, the verification succeeds. For example, in the verification information, a range of the geographical location information is the area P in FIG. 5, the movement direction is north-south, the positioning delay is less than 1 second, the positioning manner is a GPS positioning manner and an operator base station positioning manner, and the positioning precision is 10 meters. In the location information sent by the GPS, the positioning manner is the GPS positioning, the precision is 5 meters, the delay is 100 milliseconds, the geographical location information is within the area P. and the movement direction calculated based on the geographical location information at at least two moments is north-south, which is consistent with the verification information. In the location information sent by the operator base station, the positioning manner is operator base station positioning, the precision is 10 meters, the delay is 2 seconds, the geographical location information is within the area P. and the movement direction calculated based on the geographical location information at at least two moments is north-south. Because the delay is greater than 1 second, the location information sent by the operator base station is inconsistent with the verification information. In the two positioning manners, if the location information corresponding to the GPS positioning manner is consistent with the verification information, the verification on the location information succeeds, thereby improving flexibility of the verification on the location information and increasing a product use scope.

In another feasible implementation, after separately sending the request for obtaining the location information of the vehicle to the GPS positioning apparatus and the operator base station of the corresponding vehicle, the server attempts to verify the first obtained location information. If the first obtained location information is consistent with the verification information, the verification on the location information succeeds. For example, because a positioning delay of the GPS positioning manner is relatively short, when the satellite signal is relatively good, the server attempts to verify location information that is sent by the GPS positioning apparatus and that is first obtained. If the location information is consistent with the verification information, the verification succeeds. When the satellite signal is poor, the location information sent by the GPS positioning apparatus cannot be obtained in time. In this case, the server attempts to verify obtained location information sent by the operator base station. If the location information is consistent with the verification information, the verification succeeds, thereby meeting requirements of different scenarios.

If the verification on the location information succeeds, the server sends an access token corresponding to the identifier of the traffic light phase information to the terminal device. After obtaining the access token, the terminal device sends the access token to the traffic light. The traffic light attempts to verify the access token, and if the verification succeeds, sends the traffic light phase information in a corresponding direction to the terminal device. The terminal device may calculate remaining red light duration or remaining green light duration based on the traffic light phase information, to plan a vehicle speed and a trip, thereby helping improve road traffic safety.

In the foregoing embodiment, after the authentication on the user identity succeeds, the server further attempts to verify the positioning manner, the positioning delay, the positioning precision, the geographical location information, and the movement direction of the terminal device. This improves accuracy of verifying the location information, and reduces a probability of sending incorrect traffic light phase information to the terminal device.

Figure 7:
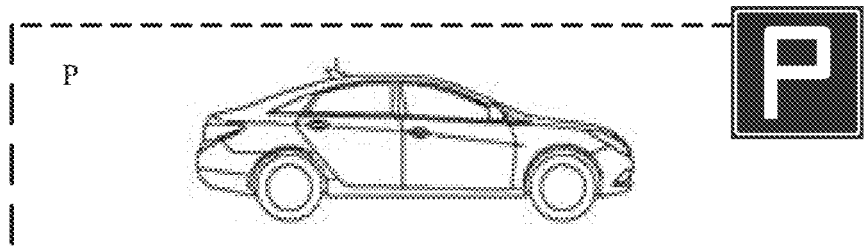
FIG. 7 is a diagram of still another application scenario of a resource obtaining method according to an embodiment of this application.

In still another application scenario, the resource obtaining method provided in this embodiment of this application is used to obtain a navigation map. As shown in FIG. 7, the target device is a garage management device, and the to-be-accessed resource is a navigation map.

The terminal device sends the resource access request information to the server based on an operation of the user. Alternatively, sending of the resource access request information is automatically triggered when the terminal device enters a preset area. The resource access request information includes the user identity and an identifier of the navigation map, and the identifier of the navigation map corresponds to an identifier of the garage management device.

After receiving the resource access request information, the server performs authentication on the user identity. For example, it is verified whether a vehicle corresponding to the user identity has navigation map download permission. If the user corresponding to the user identity has the navigation map download permission, the authentication succeeds. If the authentication succeeds, the server obtains the location information of the terminal device. Specifically, the server obtains the identifier of the terminal device based on the user identity, and sends the location information obtaining request to the terminal device corresponding to the identifier of the terminal device, and the terminal device sends the location information to the server. In a possible implementation, for example, the terminal device is a vehicle. Because the navigation map is generally disposed in a garage, a satellite signal cannot be received in an underground garage. The server sends the location information obtaining request to a built-in WI-FI positioning module of the vehicle corresponding to the vehicle identifier, to ensure that the location information can be obtained in time. The location information includes the geographical location information and the positioning assistance information, and the positioning assistance information includes the movement speed.

After obtaining the location information of the terminal device, the server attempts to verify the location information of the terminal device. Specifically, the server obtains verification information corresponding to the identifier of the garage management device. The verification information includes the location parameter that needs to be verified and the range corresponding to the location parameter that needs to be verified. The server attempts to verify the obtained location information based on the range corresponding to the location parameter that needs to be verified. In this embodiment, the location parameter that needs to be verified and that is in the verification information includes the geographical location information and the movement speed. The server determines the movement speed of the terminal device based on the geographical location information obtained at at least two moments. If it is determined that the terminal device is within the predetermined area based on the geographical location information of the terminal device, and the movement speed of the terminal device is less than a preset speed, the verification succeeds. If the movement speed of the terminal device is relatively high, when the server obtains the location information of the terminal device, the terminal device may have left a current location. As a result, the obtained location information cannot reflect an actual location of the terminal device. The movement speed of the terminal device is verified, so that accuracy of the geographical location information obtained by the server is improved.

In another feasible implementation, if the to-be-accessed resource is a navigation map, in addition to the movement speed, the positioning assistance information further includes the positioning precision and positioning security. When the geographical location information, the movement speed, the positioning precision, and the positioning security of the terminal device are all consistent with the range corresponding to the location parameter that needs to be verified, the verification on the location information can succeed. For example, in the verification information, the range corresponding to the geographical location information is an area P in FIG. 7, the positioning precision is at a submeter level, the positioning security is medium, and the movement speed is less than 15 km/h. If the geographical location information of the current vehicle is located in the area P, and the positioning manner is the WI-FI positioning, corresponding positioning precision is at a submeter level, positioning security is medium, a movement speed calculated based on the geographical location information at at least two moments is 10 km/h, and the verification succeeds. The geographical location information, the movement speed, the positioning precision, and the positioning security of the terminal device are verified, thereby further improving accuracy of the verification on the location information.

If the verification on the location information succeeds, the server sends an access token corresponding to the identifier of the navigation map to the terminal device. After obtaining the access token, the terminal device sends the access token to the garage management device. The garage management device attempts to verify the access token, and if the verification succeeds, sends the navigation map to the terminal device, so that the user can quickly find a parking space.

In the foregoing embodiment, after the authentication on the user identity succeeds, the server further attempts to verify the geographical location information, the positioning precision, the positioning security, and the movement speed of the terminal device, thereby improving accuracy of the obtained location information, and avoiding sending the navigation map to an irrelevant terminal device.

In another application scenario, the location information of the terminal device may be in another combination manner. For example, in a scenario in which a car lock of a shared car is unlocked in a shared car by using a mobile phone, the location information that needs to be obtained by the server includes the geographical location information, the positioning precision, and the positioning manner of the mobile phone. A user can use the mobile phone to open the car lock only when the verification on the location information succeeds. In a scenario in which a user uses a mobile phone to participate in a data gift grabbing activity in a shopping mall, the location information that needs to be obtained by the server includes the geographical location information and the positioning manner of the mobile phone. The user can use the mobile phone to open a data gift grabbing link only after the location information is successfully verified.

Figure 8:
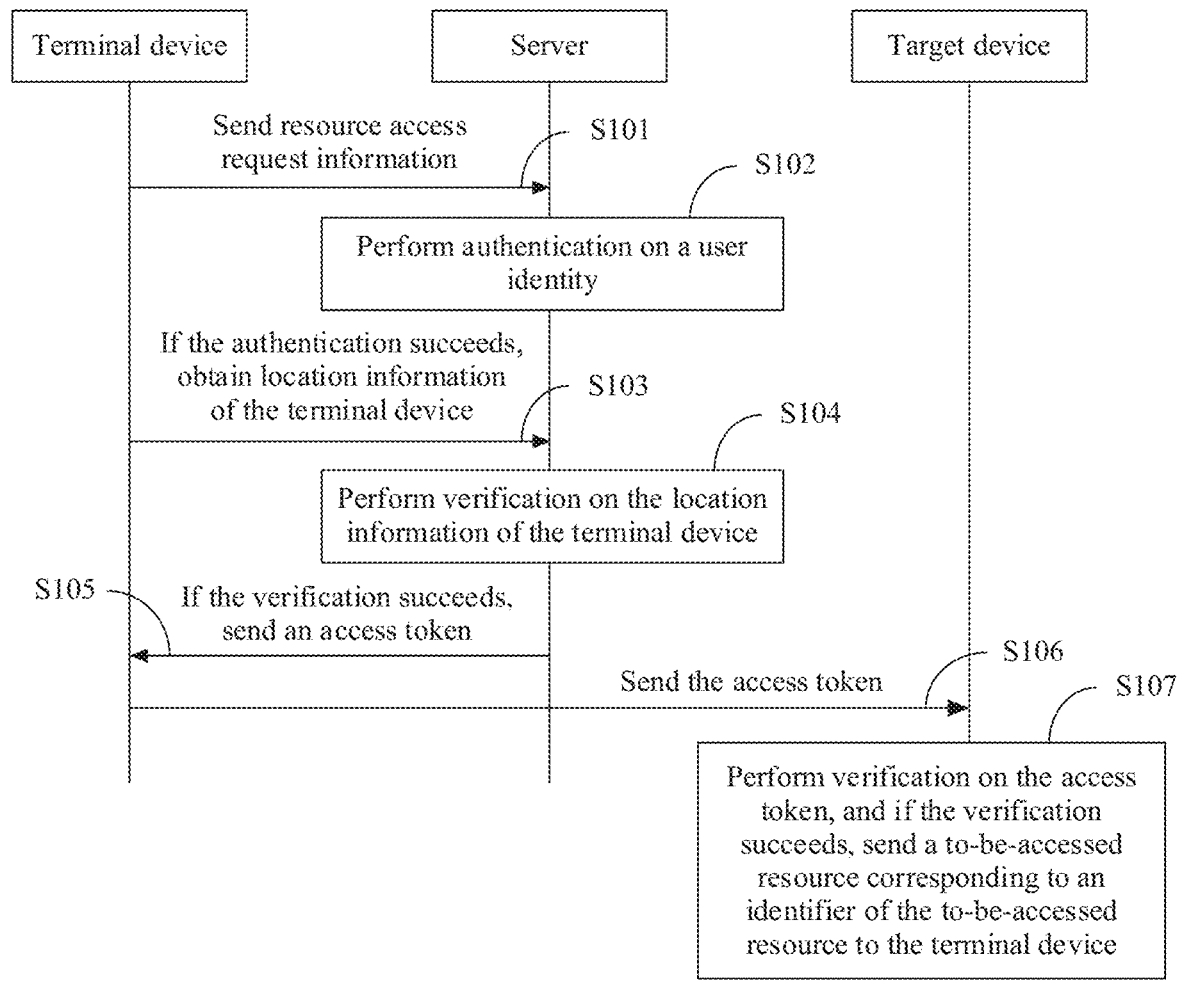
FIG. 8 is a flowchart of a resource obtaining method according to an embodiment of this application.

FIG. 8 is a specific flowchart of a resource obtaining method according to an embodiment of this application. As shown in FIG. 8, the method includes the following steps.

S101. The terminal device sends the resource access request information for accessing the target device to the server, and the resource access request information carries the user identity and the identifier of the to-be-accessed resource.

The user identity may be account information of the user, for example, a user name, a mobile phone number, or an email address, or may be the identifier of a terminal device bound to the user identity. The identifier of the to-be-accessed resource corresponds to the to-be-accessed resource. The identifier of the to-be-accessed resource may be a uniform resource identifier (Uniformed Resource Identifier, URI), a universally unique identifier (Universally Unique Identifier, UUID), or an identifier in another form of the to-be-accessed resource. The to-be-accessed resource is stored in the target device, and may be the status information of a door lock, the traffic light phase information, the navigation map, the data gift grabbing link, or the like. The terminal device may generate the resource access request information based on an operation performed by the user on the terminal device, or may generate the resource access request information when entering preset geographical location information or entering a preset state.

S102. The server performs authentication on the user identity.

Specifically, the server performs authentication on the user identity based on pre-stored authentication information, for example, searches the authentication information for an identifier consistent with the user identity, and if the identifier exists, the authentication succeeds.

S103. If the authentication succeeds, the server obtains the location information of the terminal device, and the location information includes the geographical location information and the positioning assistance information.

Specifically, if user identity information is authenticated, the server obtains an identifier of a terminal device corresponding to the user identity, and sends the location information obtaining request to the corresponding terminal device, and the terminal device sends the location information to the server. In another possible implementation, the server obtains an identifier of a corresponding positioning apparatus based on the user identity, and sends the location information obtaining request to the corresponding positioning apparatus. The positioning apparatus sends detected location information of the terminal device to the server. The positioning apparatus may be a built-in positioning apparatus in the terminal device, a built-in positioning apparatus in the target device, a positioning apparatus within a predetermined range away from the target device, or a built-in positioning apparatus in a third-party server, so that the location information can be obtained in different scenarios, thereby increasing a product use scope.

The geographical location information may be in a plurality of formats such as longitude and latitude, street and house number, and room. The positioning assistance information may be the positioning accuracy, the positioning delay, the positioning security, the positioning manner, the movement speed, and/or the movement direction. The positioning accuracy may be at a centimeter, submeter, meter, 10 meters, or 100 meters level. The positioning delay refers to a delay from a time when positioning is initiated to a time when the location information is obtained. The positioning security refers to whether a specified positioning process may be spoofed, attacked by a man-in-the-middle, or forged. The positioning security is related to the positioning manner, and the positioning manner includes the GPS positioning, the WI-FI positioning, BLUETOOTH positioning, the UWB positioning, the operator base station positioning, visual positioning, and radar positioning. The positioning precision and the positioning security vary with the positioning manners. For example, the UWB positioning has highest security, the GPS positioning has lower security, and the video positioning and the radar positioning manner has lowest security. In addition, the positioning precision and the positioning security are also related to environmental factors. If surrounding environmental factors are different, the positioning precision and the positioning security are also different. For example, in an open environment, the positioning precision of the GPS positioning can reach the meter level. However, when there are many buildings in a city, the positioning precision can only reach the 10-meter level. The movement speed and the movement direction are calculated by the terminal device based on the geographical location information at at least two moments. In another feasible implementation, the server calculates the movement speed or the movement direction based on the geographical location information that is at at least two moments and that is sent by the terminal device.

In a possible implementation, if the authentication on the user identity succeeds, the server determines, based on the pre-obtained verification information, whether location verification needs to be performed, and if the location verification needs to be performed, obtains, from the verification information, the location parameter that needs to be verified. For example, the verification information is a correspondence table shown in Table 1. The correspondence table stores a correspondence among an identifier of a target device, an identifier of a to-be-accessed resource, and the location parameter that needs to be verified. In Table 1, the identifier of the target device and the identifier of the to-be-accessed resource are stored in an access resource field, and the geographical location, the positioning precision, the positioning delay, the positioning manner, the movement speed, the movement direction, and the positioning security are the location parameters that need to be verified. When the user identity authentication succeeds, the server obtains, from the correspondence table based on the identifier of the to-be-accessed resource, the location parameter that needs to be verified. For example, in Table 1, for an access resource URI 1, the positioning manner and the movement speed in the location parameter that needs to be verified are NA, and "NA" indicates that the positioning manner and the movement speed do not need to be verified. If the location parameters that need to be verified include the geographical location information, the positioning precision, the positioning delay, the movement direction, and the movement security, the server obtains the geographical location information, the positioning precision, the positioning delay, the movement direction, and the positioning security of the terminal device.

TABLE 1

| Access resource | Geography location | Positioning Precision | Positioning delay | Positioning manner | Movement speed | Movement direction | Positioning security |
|---|---|---|---|---|---|---|---|
| URI1 | Area 1 | 10-meter level | <1 s | NA | NA | From north to south | Low |
| URI2 | Area 2 | Sub-meter level | NA | NA | <15 km/h | NA | Medium |
| URI3 | Area 3 | Centimeter level | NA | UWB | NA | NA | High |

S104. The server attempts to verify the location information of the terminal device.

Specifically, the server determines whether the terminal device is within a predetermined area based on the geographical location information, and determines whether the positioning assistance information meets a preset condition. For example, in addition to the location parameter that needs to be verified, the verification information further includes the range corresponding to the location parameter that needs to be verified. For example, in Table 1, when the access resource is a URI 2, the range corresponding to the geographical location information that needs to be verified is a predetermined area, that is, an area 2. The positioning precision is at the submeter level, the movement speed is less than 15 km/h, and the positioning security is medium. The server attempts to verify the location information of the terminal device based on the range corresponding to the location parameter that needs to be verified, to determine whether the location information of the terminal device is consistent with the range corresponding to the location parameter that needs to be verified. For example, if the location parameter that needs to be verified includes the geographical location information, the positioning precision, and the positioning manner, the server calculates, based on the geographical location information and the positioning precision of the terminal device, a location range in which the terminal device is located. If the location range in which the terminal device is located is consistent with the range corresponding to the geographical location information in the verification information, and the positioning manner matches the preset positioning manner in the verification information, the verification on the location information succeeds. For another example, if the location parameter that needs to be verified includes the geographical location information and the movement direction, if the geographical location information is consistent with the range corresponding to the geographical location information in the verification information, and the movement direction is consistent with a preset direction in the verification information, the verification on the location information succeeds.

S105. If the verification succeeds, the server sends the access token corresponding to the identifier of the to-be-accessed resource to the terminal device.

S106. The terminal device sends the access token to the target device.

S107. The target device attempts to verify the access token, and if the verification succeeds, the target device sends the to-be-accessed resource corresponding to the to-be-accessed resource identifier to the terminal device.

For example, the target device compares the access token with a preset token. If the access token is consistent with the preset token, the verification succeeds. If the verification succeeds, the terminal device obtains, from the target device, the to-be-accessed resource corresponding to the to-be-accessed resource identifier.

In a possible implementation, when the terminal device accesses the server for the first time, if the verification on the location information succeeds, the server sends the access token to the terminal device, and the terminal device stores the access token and sends the access token to the target device. When the terminal device accesses the server next time, if the verification on the location information succeeds, the server sends verification success information to the terminal device, and the terminal device sends the stored access token to the target device based on the verification success information, to reduce a quantity of times that the server sends the access token, and save resource occupation space of the server. When the terminal device accesses the server for a preset quantity of times, the server sends a new access token to the terminal device, and further sends verification information of the new access token to the target device. The terminal device obtains the to-be-accessed resource on the target device based on the new access token, thereby improving resource access security.

In the foregoing embodiment, the terminal device sends the resource access request information to the server, where the resource access request information carries the user identity and the identifier of the to-be-accessed resource. The server performs authentication on the user identity, and if the authentication succeeds, obtains the location information of the terminal device. The server performs authentication on the location information of the terminal device, and if the authentication succeeds, sends the access token corresponding to the identifier of the to-be-accessed resource to the terminal device. That is, in addition to authenticating the user identity, the server further attempts to verify the location information of the terminal device, and only when the verification on the location information succeeds, the terminal device can obtain the access token and obtain the to-be-accessed resource corresponding to the identifier of the to-be-accessed resource from the target device based on the access token. This reduces a probability of sending the to-be-accessed resource to an irrelevant device, and implements proper management and control of the to-be-accessed resource. In addition, because the location information includes the geographical location information and the positioning assistance information, accuracy of the verification on the location information is improved, thereby further reducing a probability of sending the to-be-accessed resource to an irrelevant device. In addition, because both the authentication of the location information and sending of the access token are performed by the server, it is convenient to synchronously update permission of the terminal device and the target device, thereby preventing a case in which use is affected because either party fails to update the permission in time.

Figure 9:
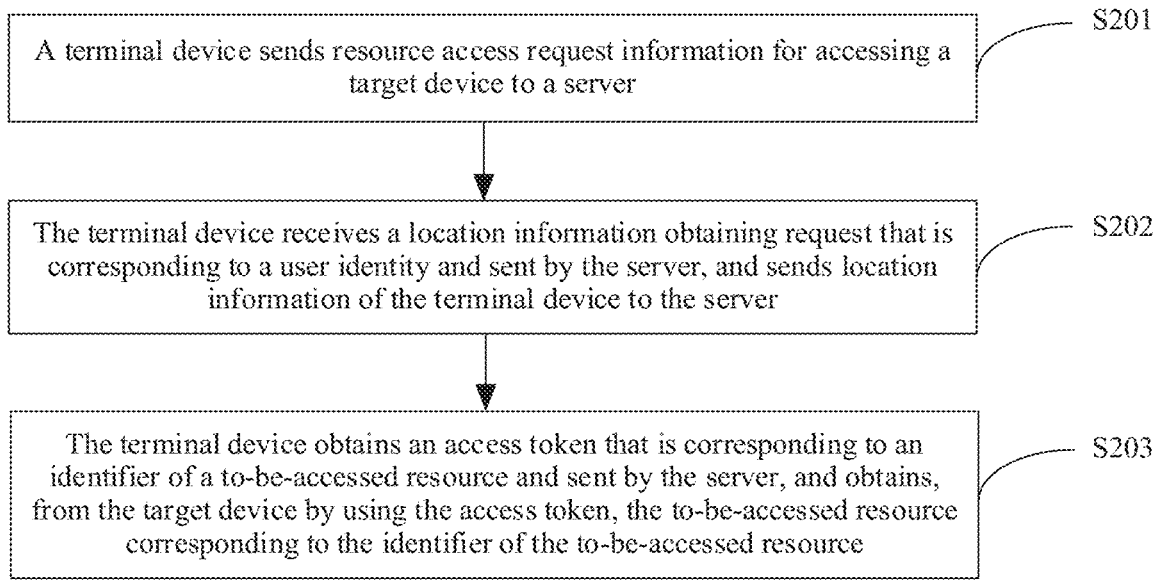
FIG. 9 is another flowchart of a resource obtaining method according to an embodiment of this application.

FIG. 9 is a schematic flowchart of a resource obtaining method according to an embodiment of this application. The method is performed by the terminal device 100. As shown in FIG. 9, the method includes the following steps.

S201. The terminal device sends the resource access request information for accessing the target device to the server, and the resource access request information carries the user identity and the identifier of the to-be-accessed resource.

S202. The terminal device receives a location information obtaining request that is corresponding to the user identity and that is sent by the server, and sends the location information of the terminal device to the server, and the location information includes the geographical location information and the positioning assistance information.

Specifically, if the authentication on the user identity succeeds, the terminal device receives the location information obtaining request, and sends the location information to the server. The positioning assistance information includes the positioning precision, the positioning delay, the positioning manner, the movement speed, and/or the movement direction.

S203. The terminal device obtains the access token that is corresponding to the identifier of the to-be-accessed resource and sent by the server, and obtains, from the target device by using the access token, the to-be-accessed resource corresponding to the identifier of the to-be-accessed resource.

Specifically, after obtaining the access token, the terminal device sends the access token to the target device, and the target device attempts to verify the access token. If the verification succeeds, the terminal device obtains the to-be-accessed resource from the target device, for example, downloads the to-be-accessed resource.

In the foregoing embodiment, when sending the resource access request information, the terminal device sends the user identity and the identifier of the to-be-accessed resource to the server, and the server performs authentication on the user identity. If the authentication succeeds, the terminal device obtains the location information obtaining request sent by the server, and sends the location information of the terminal device to the server. The server attempts to verify the location information of the terminal device. If the verification succeeds, the terminal device receives the access token sent by the server, and obtains the to-be-accessed resource from the target device by using the access token. Before obtaining the to-be-accessed resource, the terminal device not only performs authentication on the user identity, but also attempts to verify the location information of the terminal device. The terminal device can obtain the to-beaccessed resource based on the access token only when the verification on the location information succeeds, thereby improving resource access security. In addition, because the location information includes the geographical location information and the positioning assistance information, accuracy of the verification on the location information is improved, and a probability of sending the to-be-accessed resource to an irrelevant device is reduced, so that the to-be-accessed resource is managed and controlled more properly.

Figure 10:
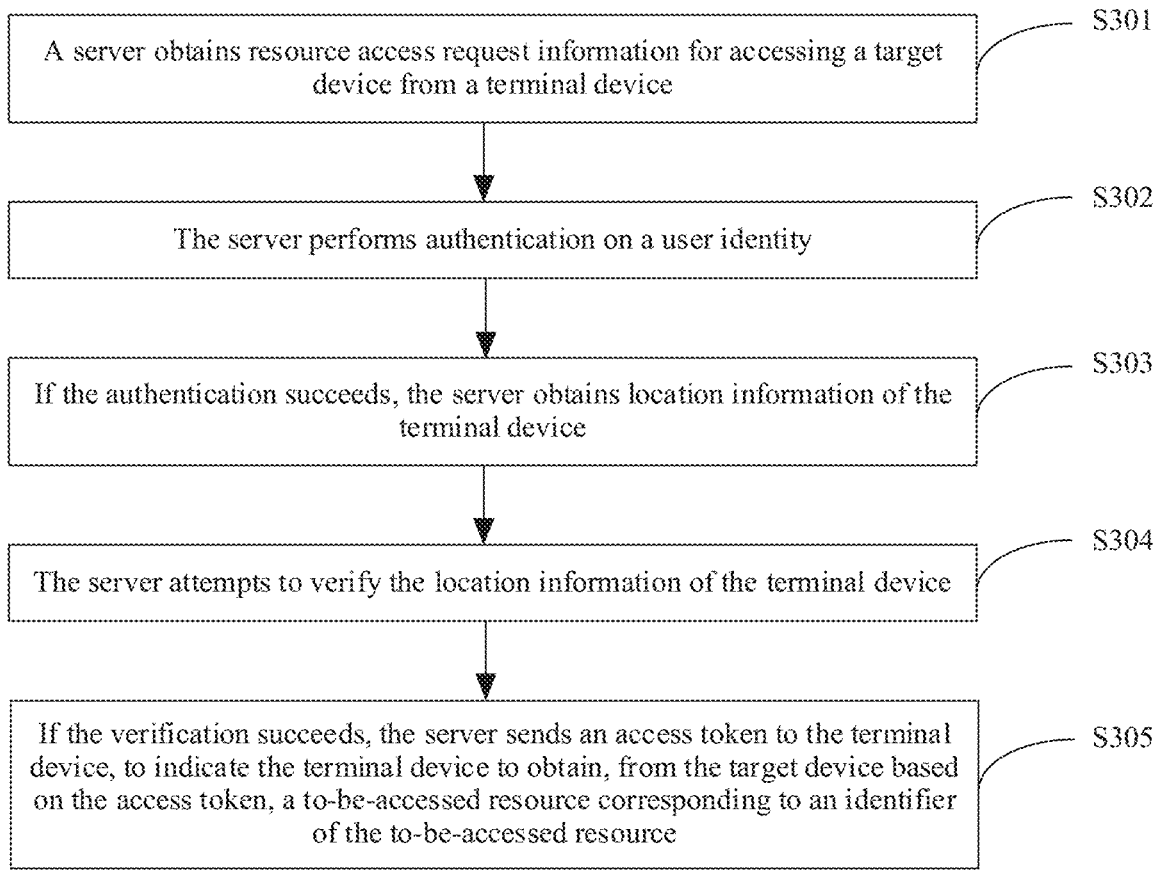
FIG. 10 is still another flowchart of a resource obtaining method according to an embodiment of this application.

FIG. 10 is a flowchart of a resource obtaining method according to an embodiment of this application. The method is performed by the server 200. As shown in FIG. 10, the method includes the following steps.

S301 The server obtains the resource access request information that is for accessing the target device and that is sent by the terminal device, and the resource access request information carries the user identity and the identifier of the to-be-accessed resource.

S302. The server performs authentication on the user identity.

Specifically, the server performs the authentication on the user identity based on the pre-stored authentication information, for example, searches the authentication information for an identifier consistent with the user identity, and if the identifier exists, the authentication succeeds.

S303. If the authentication succeeds, the server obtains the location information of the terminal device, and the location information includes the geographical location information and the positioning assistance information.

Specifically, the server obtains the location information sent by the terminal device, or obtains the location information of the terminal device collected by the positioning apparatus. The positioning assistance information includes the positioning precision, the positioning delay, the positioning manner, the movement speed, and/or the movement direction.

S304. The server attempts to verify the location information of the terminal device.

Specifically, the server obtains the verification information corresponding to the identifier of the to-be-accessed resource. The verification information includes the location parameter that needs to be verified and the range corresponding to the location parameter that needs to be verified. The server attempts to verify the location information of the terminal device based on the range corresponding to the location parameter that needs to be verified.

S305. If the verification succeeds, the server sends the access token to the terminal device, to indicate the terminal device to obtain, from the target device based on the access token, the to-be-accessed resource corresponding to the identifier of the to-be-accessed resource.

Specifically, if the location information of the terminal device is consistent with the range corresponding to the location parameter that needs to be verified, the verification succeeds. If the verification succeeds, the server sends the access token to the terminal device. After obtaining the access token, the terminal device sends the access token to the target device. The target device attempts to verify the access token. If the verification succeeds, the terminal device obtains, from the target device, the to-be-accessed resource corresponding to the identifier of the to-be-accessed resource.

In the foregoing embodiment, when obtaining the resource access request information sent by the terminal device, the server performs authentication on the resource access request information. If the authentication succeeds, the server obtains the location information of the terminal device, and attempts to verify the location information. If the verification succeeds, the server sends the access token to the terminal device, and the terminal device obtains the to-be-accessed resource based on the access token. In addition to performing authentication on the user identity, the server further attempts to verify the location information of the terminal device. The terminal device is allowed to obtain the to-be-accessed resource only when the verification on the location information succeeds. This reduces a probability of sending the to-be-accessed resource to an irrelevant device, implements proper management and control of the to-be-accessed resource, and improves resource access security. In addition, because the location information includes the geographical location information and the positioning assistance information, accuracy of the verification on the location information is improved, thereby further reducing a probability of sending the to-be-accessed resource to an irrelevant device. In addition, because both the authentication of the location information and sending of the access token are performed by the server, it is convenient to synchronously update the permission of the terminal device and the target device, thereby preventing a case in which use is affected because either party fails to update the permission in time.

In the foregoing embodiments, the description of each embodiment has respective focuses. For a part that is not described in detail or recorded in an embodiment, refer to related descriptions in other embodiments.

Figure 11:
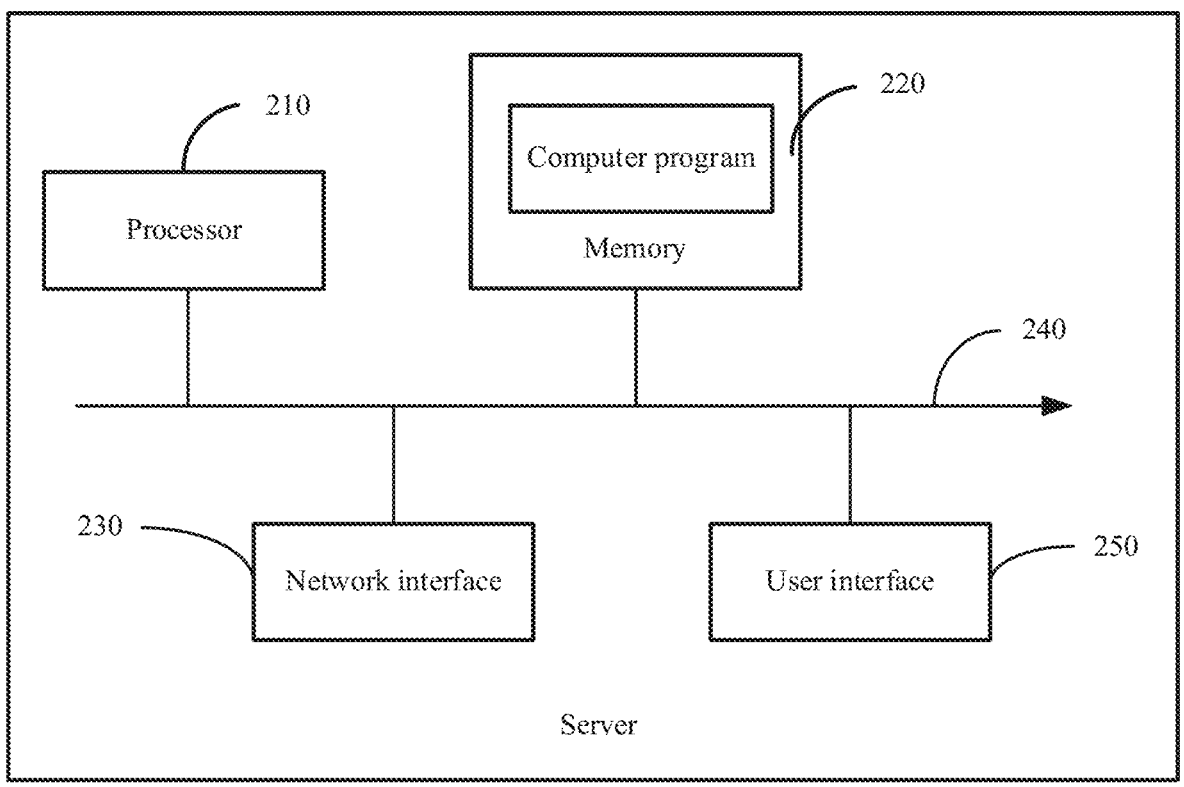
FIG. 11 is a schematic diagram of a structure of a server according to an embodiment of this application.

Based on a same inventive concept, an embodiment of this application further provides a server. FIG. 11 is a schematic diagram of a structure of a server according to an embodiment of this application. As shown in FIG. 11, a server 200 provided in this embodiment may include a processor 210, a memory 220, and a network interface 230. The processor 210, the memory 220, and the network interface 230 are connected by using a communications bus 240.

The processor 210 may be a central processing unit (Central Processing Unit, CPU), and may further be another general purpose processor, a digital signal processor (Digital Signal Processor, DSP), an application-specific integrated circuit (Application Specific Integrated Circuit, ASIC), a field-programmable gate array (Field-Programmable Gate Array, FPGA), or another programmable logic component, a discrete gate, a transistor logic device, or a discrete hardware component. Optionally, the processor 210 may include one or more processing units.

The memory 220 may be an internal storage unit of the server 200, for example, a hard disk or a memory of the server 200. The memory 220 may also be an external storage device of the server 200, for example, a plug-in hard disk, a smart media card (Smart Media Card. SMC), a secure digital (Secure Digital, SD) card, or a flash card (Flash Card) provided on the server 200. Further, the memory 220 may further include both an internal storage unit of the server 200 and an external storage device. The memory 220 is configured to store a computer program and another program and data required by the server 200. The memory 220 may be configured to temporarily store output data or to-be-output data.

The network interface 230 may be configured to receive and send information, may include a wired interface and/or a wireless interface, and is usually configured to establish a communication connection between the server 200 and another electronic device. For example, in this application, the network interface 230 may receive the location information sent by the terminal device 100, and send the access token to the terminal device 100.

Optionally, the server 200 may further include a user interface 250. The user interface 250 may include a display (Display) and an input unit such as a keyboard (Keyboard). Optionally, the user interface 250 may further include a standard wired interface and a standard wireless interface. Optionally, in some embodiments, the display may be an LED display, a liquid crystal display, a touch liquid crystal display, an OLED (Organic Light-Emitting Diode, organic light-emitting diode) toucher, or the like. The display may also be appropriately referred to as a display screen or a display unit, and is configured to display information processed in the server 200 and display a visualized user interface.

A person skilled m the art may understand that FIG. 11 is merely an example of the server, and does not constitute a limitation on the server. The server may include more or fewer components than those shown in the figure, or combine some components, or have different component arrangements.

The server provided in this embodiment can perform the foregoing method embodiments, and implementation principles and technical effects of the server are similar to those of the foregoing method embodiments. Details are not described herein again.

It may be clearly understood by a person skilled in the art that, for the purpose of convenient and brief description, division into the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

When the integrated unit is implemented in the form of the software functional unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least: any entity or apparatus that can carry the computer program code to a photographing apparatus/terminal device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    sending, by a terminal device to a server, resource access request information for accessing a target device, wherein the resource access request information carries a user identity and a first identifier of a to-be-accessed resource;
    authenticating, by the server, the user identity;
    obtaining, by the server in response to successfully authenticating the user identity, location information of the terminal device by obtaining, based on the first identifier, a location parameter that needs to be verified from a correspondence table, wherein the correspondence table stores a correspondence between the first identifier, a second identifier of a target device, and the location parameter, wherein the location information comprises geographical location information indicating a geographical location of the terminal device and positioning assistance information indicating a positioning of the terminal device, and wherein the positioning assistance information comprises a positioning delay, a positioning manner, a movement speed of the terminal device, and a movement direction of the terminal device;

verifying, by the server, the geographical location, the positioning delay, the positioning manner, the movement speed, and the movement direction;

sending, by the server, to the terminal device, and in response to successfully verifying the geographical location, the positioning delay, the positioning manner, the movement speed of the terminal device, and the movement direction, an access token corresponding to the first identifier; and obtaining, by the terminal device from the target device, the to-be-accessed resource based on the access token.

2. The method of claim 1, wherein obtaining the location information further comprises:

sending a first request to obtain the location information to a positioning apparatus;

sending a second request to obtain the location information to a base station of the terminal device;

obtaining first location information from the positioning apparatus or second location information from the base station; and verifying a first obtained one of the first location information or second location information.

3. The method of claim 1, wherein the positioning manner comprises global positioning system (GPS) positioning, WI-FI positioning, BLUETOOTH positioning, ultra-wideband positioning (UWB) positioning, operator base station positioning, visual positioning, and radar positioning.

4. A method implemented by a server, the method comprising:

obtaining, from a terminal device, resource access request information for accessing a target device, wherein the resource access request information carries a user identity and a first identifier of a to-be-accessed resource;

authenticating the user identity;

obtaining, in response to successfully authenticating the user identity, location information of the terminal device by obtaining, based on the first identifier, a location parameter that needs to be verified from a correspondence table, wherein the correspondence table stores a correspondence between the first identifier, a second identifier of a target device, and the location parameter, wherein the location information comprises geographical location information indicating a geographical location of the terminal device and positioning assistance information indicating a positioning of the terminal device, and wherein the positioning assistance information comprises a positioning delay, a positioning manner, a movement speed of the terminal device, and a movement direction of the terminal device;

verifying the geographical location, the positioning delay, the positioning manner, the movement speed, and the movement direction; and sending, to the terminal device and in response to successfully verifying the geographical location, the positioning delay, the positioning manner, the movement speed, and the movement direction, an access token corresponding to the first identifier to indicate to the terminal device to obtain, from the target device, the to-be-accessed resource based on the access token.

5. The method of claim 4, wherein the positioning assistance information further comprises a positioning accuracy.

6. The method of claim 5, further comprising:

determining, based on the geographical location information, that the terminal device is within a predetermined area; and determining that the positioning assistance information meets a preset condition.

7. The method of claim 5, further comprising:

determining, based on the geographical location information and the positioning assistance information, that the terminal device is within a predetermined area, wherein the to-be-accessed resource comprises status information of a door lock, and wherein the positioning assistance information further comprises a positioning precision;

calculating, based on the geographical location information and the positioning precision, a location range in which the terminal device is located; and determining that the location range is within the predetermined area.

8. The method of claim 6, wherein the to-be-accessed resource comprises traffic light phase information, wherein the method further comprises determining that the movement direction is consistent with a preset direction.

9. The method of claim 6, wherein the to-be-accessed resource comprises a navigation map, wherein the method further comprises determining that the movement speed is less than a preset speed.

10. The method of claim 8, wherein the method further comprises determining that the positioning delay is less than a preset duration.

11. The method of claim 4, further comprising obtaining the location information from a positioning apparatus.

12. A server comprising:

a memory configured to store instructions; and one or more processors coupled to the memory and configured to execute the instructions to cause the server to:

obtain, from a terminal device, resource access request information for accessing a target device, wherein the resource access request information carries a user identity and a first identifier of a to-be-accessed resource;

authenticate the user identity;

obtain, in response to successfully authenticating the user identity, location information of the terminal device by obtaining, based on the first identifier, a location parameter that needs to be verified from a correspondence table, wherein the correspondence table stores a correspondence between the first identifier, a second identifier of a target device, and the location parameter, wherein the location information comprises geographical location information indicating a geographical location of the terminal device and positioning assistance information indicating a positioning of the terminal device, and wherein the positioning assistance information comprises a positioning delay, a positioning manner, a movement speed of the terminal device, and a movement direction of the terminal device;

verify the geographical location, the positioning delay, the positioning manner, the movement speed, and the movement direction; and send, to the terminal device and in response to successfully verifying the geographical location, the positioning delay, the positioning manner, the movement speed, and the movement direction, an access token corresponding to the first identifier to indicate the terminal device to obtain, from the target device, the to-be-accessed resource based on the access token.

13. The server of claim 12, wherein the positioning assistance information further comprises a positioning accuracy.

14. The server of claim 12, wherein the one or more processors is further configured to execute the instructions to cause the server to:
determine, based on the geographical location information, that the terminal device is within a predetermined area; and
determine, that the positioning assistance information meets a preset condition.

15. The server of claim 12, wherein the one or more processors is further configured to execute the instructions to cause the server to determine, based on the geographical location information and the positioning assistance information, that the terminal device is within a predetermined area.

16. The server of claim 13, wherein the to-be-accessed resource comprises traffic light phase information, and wherein the one or more processors is further configured to execute the instructions to cause the server to:
determine that the movement direction is consistent with a preset direction when the positioning assistance information comprises the movement direction; and
determine that the positioning delay is less than a preset duration when the positioning assistance information comprises the positioning delay.

17. The server of claim 12, wherein the positioning assistance information further comprises a positioning accuracy of the terminal device.

18. The server of claim 13, wherein the to-be-accessed resource comprises a navigation map, and wherein the one or more processors is further configured to execute the instructions to cause the server to determine that the movement speed is less than a preset speed.

19. The server of claim 15, wherein the to-be-accessed resource comprises status information of a door lock, wherein the positioning assistance information further comprises a positioning precision, and wherein the one or more processors is further configured to execute the instructions to cause the server to:

calculate, based on the geographical location information and the positioning precision, a location range in which the terminal device is located; and
determine that the location range is within the predetermined area.

20. A computer program product comprising computer-executable instructions that are stored on a non-transitory computer-readable storage medium and that, when executed by one or more processors, cause a server to:
obtain, from a terminal device, resource access request information for accessing a target device, wherein the resource access request information carries a user identity and a first identifier of a to-be-accessed resource;
authenticate the user identity;
obtain, in response to successfully authenticating the user identity, location information of the terminal device by obtaining, based on the first identifier, a location parameter that needs to be verified from a correspondence table, wherein the correspondence table stores a correspondence between the first identifier, a second identifier of a target device, and the location parameter, wherein the location information comprises geographical location information indicating a geographical location of the terminal device and positioning assistance information indicating a positioning of the terminal device, and wherein the positioning assistance information comprises a positioning delay, a positioning manner, a movement speed of the terminal device, and a movement direction of the terminal device;
verify the geographical location, the positioning delay, the positioning manner, the movement speed, and the movement direction; and
send, to the terminal device and in response to successfully verifying the geographical location, the positioning delay, the positioning manner, the movement speed, and the movement direction, an access token corresponding to the first identifier to indicate the terminal device to obtain, from the target device, the to-be-accessed resource based on the access token.

* * * * *